E. B. JACKSON.
MOTOR VEHICLE.
APPLICATION FILED AUG. 8, 1919.
1,390,441.
Patented Sept. 13, 1921.
2 SHEETS—SHEET 1.
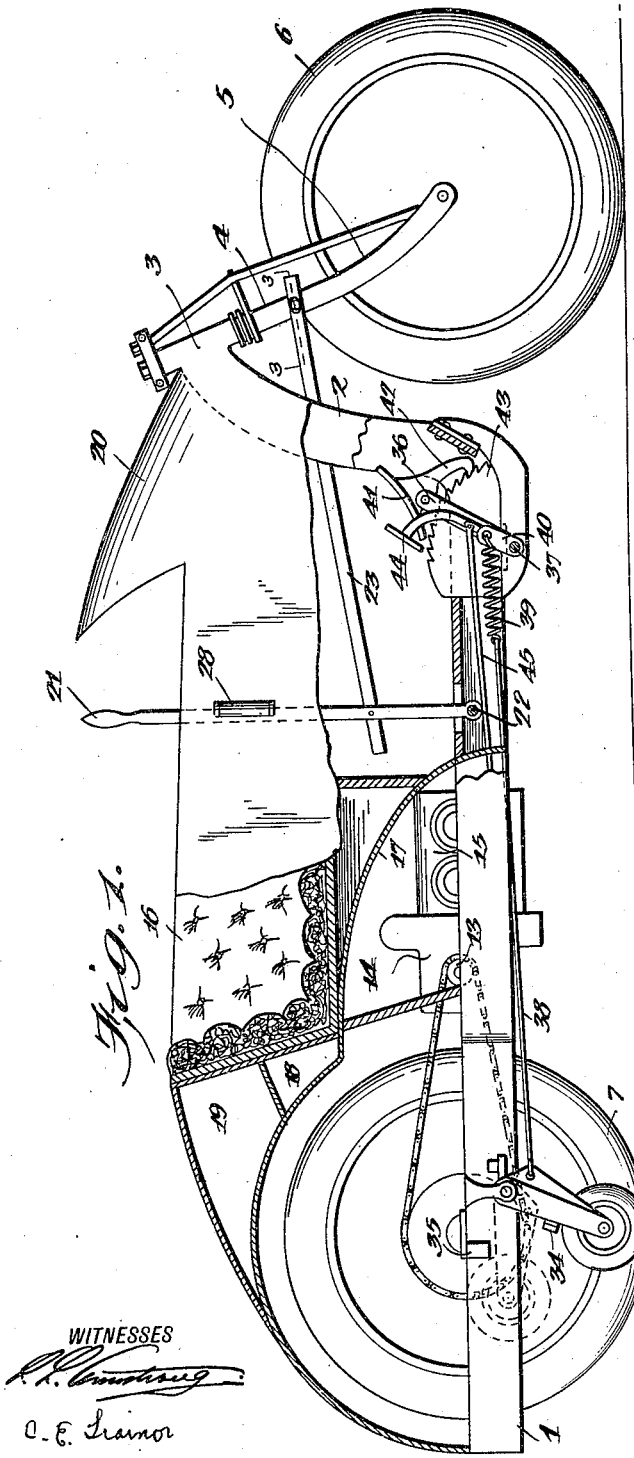
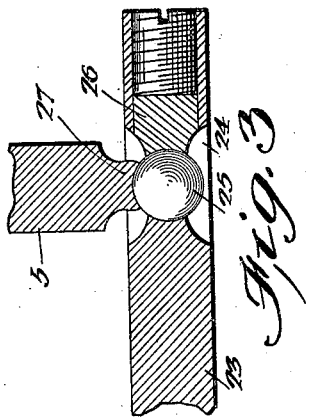
WITNESSES
INVENTOR
E. B. Jackson,
BY
ATTORNEYS

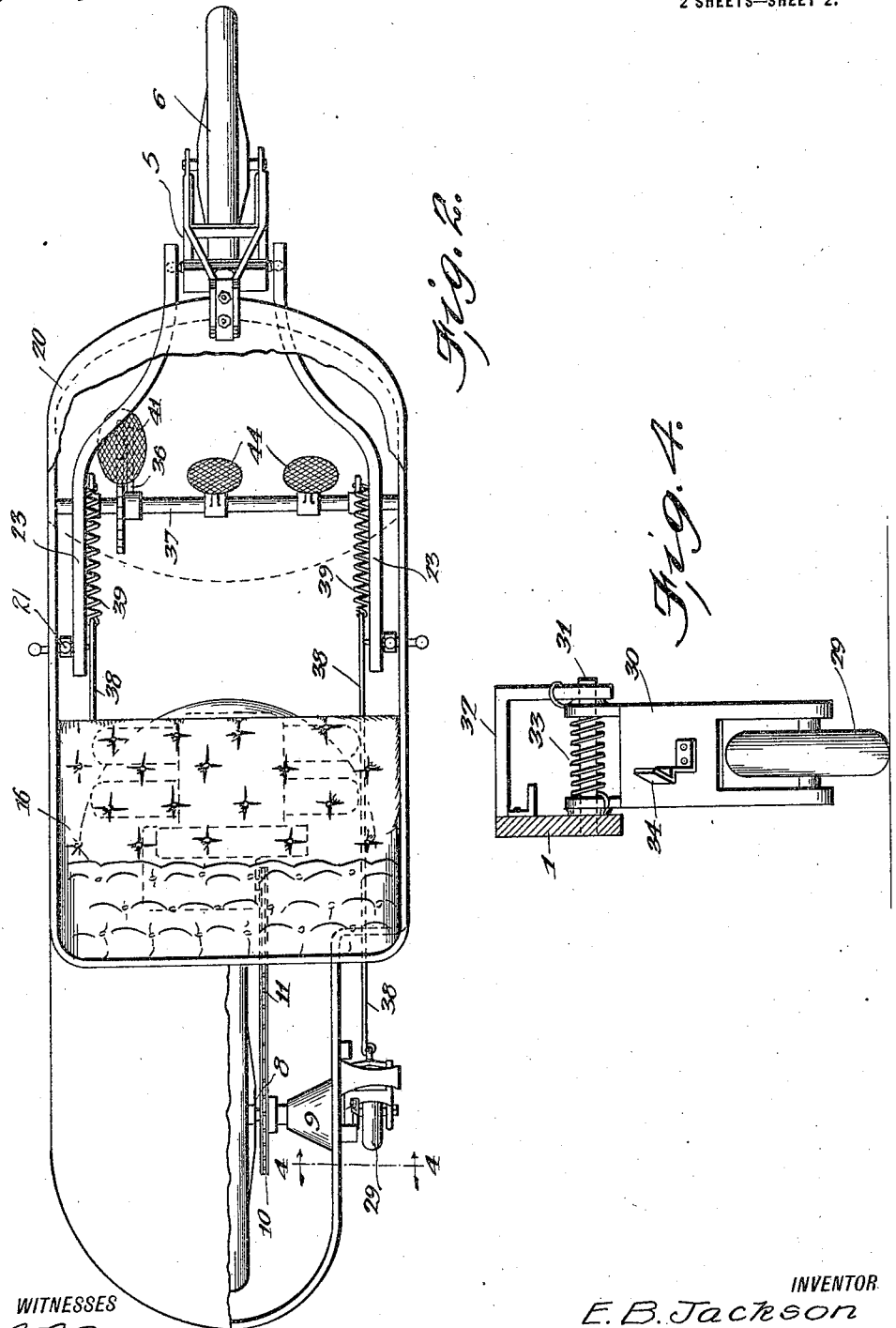

UNITED STATES PATENT OFFICE.

EVERETT BANFIELD JACKSON, OF COLORADO SPRINGS, COLORADO.

MOTOR-VEHICLE.

1,390,441.

Specification of Letters Patent.  Patented Sept. 13, 1921.

Application filed August 8, 1919. Serial No. 316,232.

*To all whom it may concern:*

Be it known that I, EVERETT B. JACKSON, a citizen of the United States, and a resident of Colorado Springs, in the county of El Paso and State of Colorado, have invented a certain new and useful Motor-Vehicle, of which the following is a specification.

My invention is a new type of motor-vehicle, and has for its object to provide a vehicle of the character specified wherein the two wheels which support the vehicle are in line in the same manner as in a bicycle or a motorcycle, with an inclosed body on the lines of an automobile, and wherein means is provided for steering the vehicle and for controlling the motor operable from the seat in the body, and wherein other means is provided for supporting the body in upright position when not in motion or moving slowly, the said means being controlled from the seat into operative and inoperative position.

In the drawings:

Figure 1 is a side view of the vehicle, with parts broken away;

Fig. 2 is a top plan view;

Fig. 3 is a section on the line 3—3 of Fig. 1;

Fig. 4 is a section on the line 4—4 of Fig. 2.

In the present embodiment of the invention a suitable frame 1 is provided, the said frame being substantially loop shaped as shown, and having upwardly bent portions 2 at its forward end, which carry an inclined bearing 3 for the body 4 of the front fork, between whose arms 5 the front wheel 6 is mounted. The rear wheel 7 is secured to an axle 8 which is journaled in bearings 9 in the frame, and this shaft carries a sprocket wheel 10 which is connected by a chain 11 with a sprocket wheel 13 on a suitable transmission held in a casing 14, the transmission being driven by a suitable motor 15.

The motor and the transmission are supported by the frame at about the level of the frame and above the motor and the transmission there is arranged an upholstered seat 16. A hood 17 is arranged above the rear wheel, the motor and the transmission, the forward and rear ends of the hood being connected with the frame, and the seat 16 is above the hood. Behind the hood are arranged an oil tank 18 and a fuel tank 19, the said tanks being connected in the usual manner to the motor. A suitable housing or body 20 is connected with the frame and the hood, the said body housing the seat, the motor, the transmission and a portion of the rear wheel.

The front wheel is guided by means of levers 21 which are pivoted to the frame as indicated at 22 and which are connected to the front fork by links 23. As shown in Fig. 3, the connection between the links 23 and the arms of the fork is a ball bearing connection. Each link has a transverse recess 24 at the fork, within which is arranged a ball 25, the ball being held between a seat on the link and a plug 26 which is threaded into the bored or cored end of the link, the plug and the seat engaging the ball at diametrically opposite points. The fork arm has a seat 27 which engages the ball, as shown in Fig. 3. Two of these levers 21 are provided, one at each side of the seat, so that the occupant of the seat may steer the vehicle with his hands and while seated. In Fig. 1 I show at 28 a door handle which may be of any suitable construction.

Supporting wheels 29 are arranged at each side of the rear wheel, it being understood that the wheels 6 and 7 are in alinement longitudinally of the vehicle, to support the vehicle when not in motion. These wheels are journaled in frames 30 which are pivoted at their upper ends on shafts supported between the frame 1 and angle brackets 32 secured to the frame. A coil spring 33 encircles each of the pivot pins 31, one end being connected with the angle bracket and the other with the frame 30, and the springs act normally to swing the frames upward, to bring the wheels into inoperative position.

Each frame has a catch 34 which is adapted to engage a latch 35 on the frame, to hold the wheel elevated. The wheels are moved into operative position by means of treadle levers 36, which are secured to a shaft 37 journaled transversely of the frame near its front end. A rod 38 is connected with each frame at its rear end, and the front end of the rod is connected by a stiff spring 39 with a radial arm 40 on the adjacent end of the shaft 37.

Referring to Figs. 1 and 2, it will be noticed that the foot plate 41 of the treadle lever 36 is pivoted to the same, and that it has a pawl 42 in connection therewith, which is adapted to engage the teeth of a ratchet segment 43 rigid with the frame. The arrangement is such that when the rear end of the foot plate is swung downward the pawl will be disengaged from the teeth, and that when the foot plate is pushed forward to bring the wheels 29 into operative position, the pawl will slip over the teeth and will engage the teeth to prevent reverse movement of the wheel, until the pawl is released. Other foot plates or pedals 44 are journaled loosely on the shaft 37, and these foot plates are connected by suitable links 45 with the clutch and brake control of the motor.

I claim:

A motor vehicle comprising a body and a pair of wheels journaled on the body in longitudinal alinement thereof, said body having a seat between the wheels, a fork comprising a body journaled on the vehicle body and arms between which the front wheel is journaled, levers pivoted to the vehicle, and links connecting the levers with the arms of the fork for swinging said fork.

EVERETT BANFIELD JACKSON.